Sept. 9, 1969
H. HUCKABY
3,465,623
TOOL HOLDER
Filed Dec. 26, 1967
2 Sheets-Sheet 1
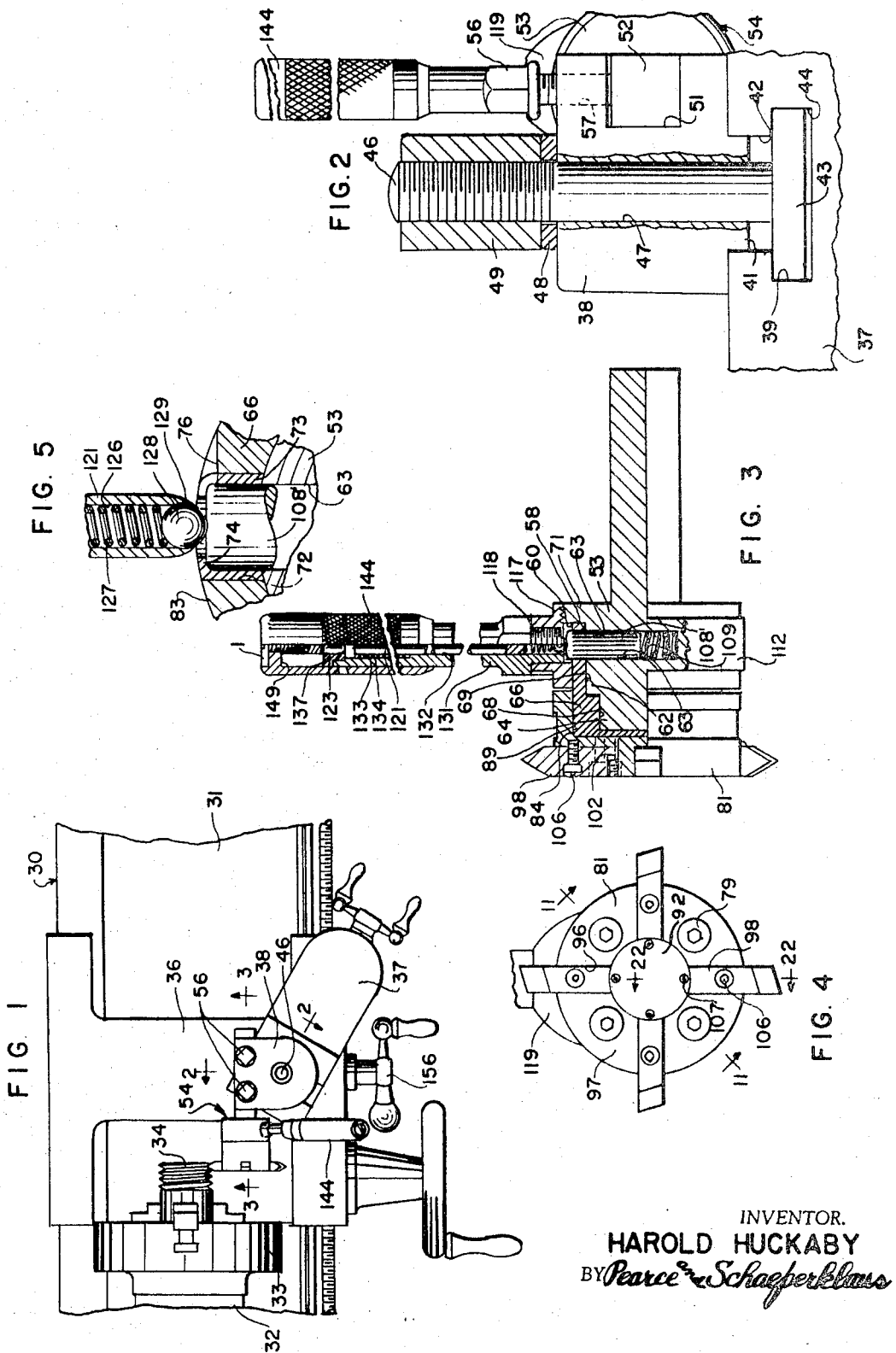
INVENTOR.
HAROLD HUCKABY
BY Pearce & Schaeferkloss
Attorneys

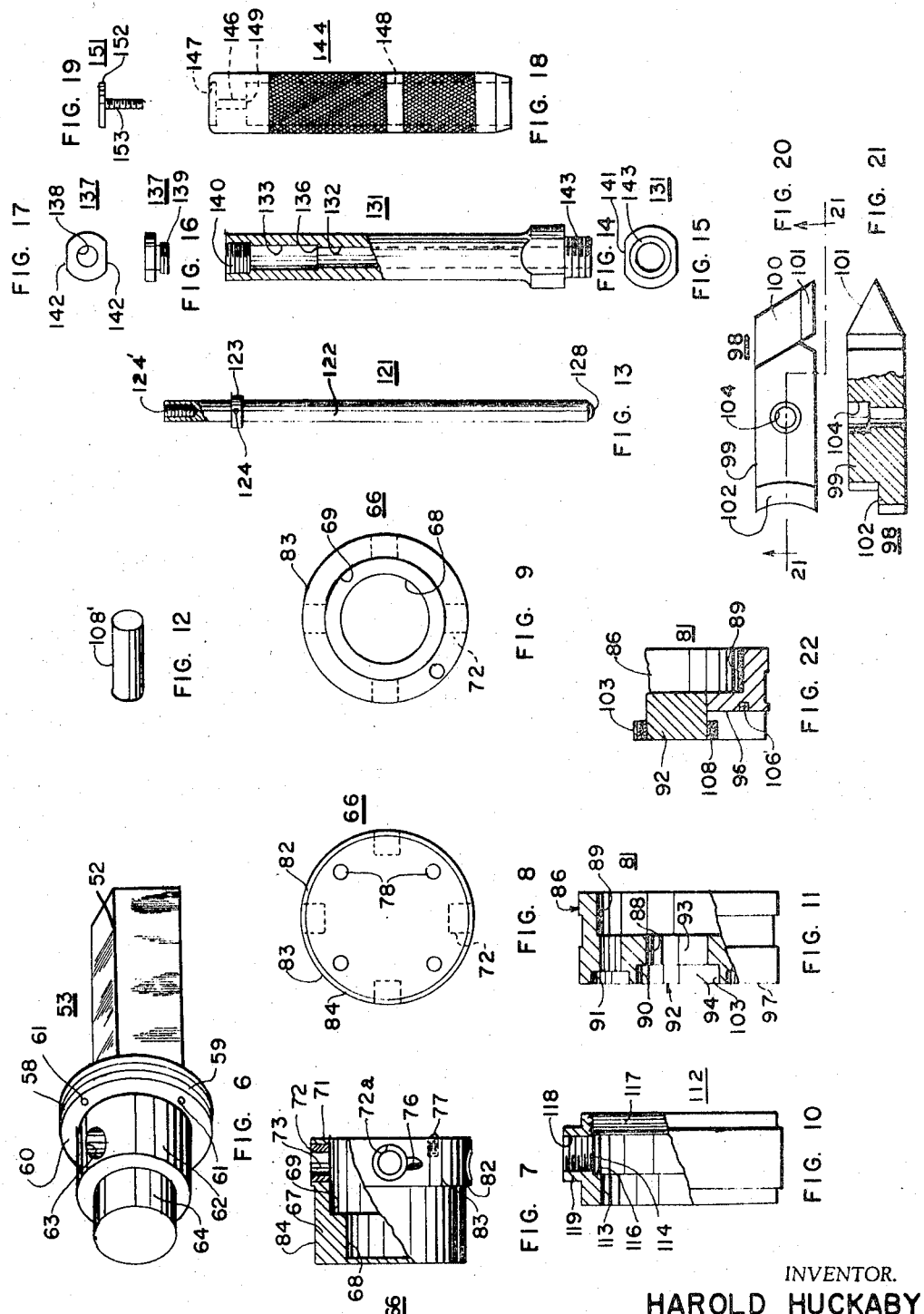

United States Patent Office 3,465,623
Patented Sept. 9, 1969

3,465,623
TOOL HOLDER
Harold Huckaby, Cincinnati, Ohio, assignor to Russell Tool Co., Cincinnati, Ohio, a corporation of Ohio
Filed Dec. 26, 1967, Ser. No. 693,526
Int. Cl. B23b 29/00, 29/24; B23q 17/00
U.S. Cl. 82—36                              6 Claims

ABSTRACT OF THE DISCLOSURE

A tool holder for a machine tool which includes a body mounted in a tool post, a head, which carries a plurality of tools, rotatably mounted on the body, a pin received in openings in the head and body for positioning the head in selected indexed positions, a swinging clamp arranged to clamp the head and body in the indexed positions, and a handle which operates the clamp and carries a plunger which can release the pin when the handle is moved axially, the plunger engaging the head to index the head when the handle is swung while the pin is released.

This invention relates to a tool holder for a machine tool.

An object of this invention is to provide a tool holder which carries a plurality of tools and which can be indexed to bring the tools sequentially into position for engagement with a workpiece.

Briefly this invention provides a tool holder including a body which can be mounted in a tool holder or post. A head which carries a plurality of tools is rotatably mounted on the body with a pin being received in openings in the head and body for positioning the head in selected indexed positions. A swinging clamp is arranged to clamp the head and body in the indexed positions. A handle which operates the clamp carries a plunger which can release the pin when the handle is moved axially. The handle has means engaging the head to index the head when the handle is swung while the pin is released.

The above and other objects and features of the invention will be apparent to those skilled in the art to which this invention pertains from the following detailed description and the drawings, in which:

FIG. 1 is a fragmentary plan view of a machine tool on which is mounted a tool holder constructed in accordance with an embodiment of this invention, a tool carried thereby being shown in engagement with a workpiece;

FIG. 2 is a view in section on an enlarged scale taken generally on the line 2—2 in FIG. 1;

FIG. 3 is a view in section of the tool holder on an enlarged scale taken on the line 3—3 in FIG. 1, parts being shown in side elevation;

FIG. 4 is a view in end elevation of the tool holder shown in FIGS. 1–3 inclusive;

FIG. 5 is a fragmentary view in transverse section of a portion of a pin, a pin operating plunger and a pin receiving sleeve which form a part of the tool holder illustrated in FIGS. 1–4 inclusive;

FIG. 6 is a perspective view of a body of the tool holder;

FIG. 7 is a view partly in side elevation and partly in section of a cup-shaped pin retaining member which is a part of the tool holder;

FIG. 8 is a view in end elevation of the cup-shaped pin retaining member;

FIG. 9 is another view in opposite end elevation of the cup-shaped pin retaining member;

FIG. 10 is a view partly in side elevation and partly in section of a clamping sleeve which forms a part of the tool holder;

FIG. 11 is a view in section of a tool carrying head of the tool holder taken generally on the line 11—11 in FIG. 4;

FIG. 12 is a perspective view of a pin which is a part of the tool holder;

FIG. 13 is a view partly in side elevation and partly in section of a pin operating plunger of the tool holder;

FIG. 14 is a view partly in section and partly in side elevation of a plunger guide which is a part of the tool holder;

FIG. 15 is a bottom plan view of the plunger guide shown in FIG. 14;

FIG. 16 is a view in side elevation of a plug which is a portion of the tool holder;

FIG. 17 is a top plan view of the plug shown in FIG. 16;

FIG. 18 is a view in side elevation of a handle which forms a portion of the tool holder;

FIG. 19 is a view in side elevation of a screw which form a part of the tool holder;

FIG. 20 is a plan view of one of the tools which are held by the tool holder;

FIG. 21 is a view in section taken on the line 21—21 in FIG. 20; and

FIG. 22 is a view in section taken on the line 22—22 in FIG. 4.

In the following detailed description and the drawings, like reference characters indicate like parts.

In FIG. 1 is shown an engine lathe 30, which can be of usual construction and includes a bed 31 on which is mounted a headstock 32. The headstock 32 carries a chuck 33 in which a workpiece 34 is mounted. The lathe includes a carriage 36 which can be moved along and crosswise of the bed in the usual fashion. The carriage 36 carries a compound rest 37 on which a tool post 38 is mounted. Details of construction of the engine lathe have been omitted. The compound rest 37 includes a transverse slot 39 (FIG. 2) of inverted T-shape. A tongue 41, which is a part of the tool post 38, extends into an upper part of an upright portion 42 of the T-slot. A plate 43 is received in a transverse portion 44 of the T-slot. A stud 46 mounted on the plate 43 extends upwardly therefrom through an upright bore 47 in the tool post 38. A washer 48 and a nut 49 mounted on the stud hold the tool post 38 in position on the compound rest 37.

The tool post is provided with a slot 51 which receives a bar portion 52 of a body 53 (FIG. 6) of a tool holder 54 (FIGS. 1 and 2). Clamp screws 56, which are mounted in upright threaded bores 57 (FIG. 2) in the tool post 38 engage the bar portion 52 to mount the body in the tool post 38.

As shown in FIG. 6, the body 53 includes an outwardly extending circular flange 58 adjacent the bar portion 52. An outer face 59 of the outwardly extending portion 58 is threaded. A shoulder face 60 of the outwardly extending portion extends at right angles to the axis of the body and is provided with four sockets 61 (only 2 of which are shown), which are arranged at 90 degree intervals around the axis. A cylindrical portion 62 of the body extends axially from the shoulder face 60. A radial bore 63 is provided in the cylindrical portion 62. The body 53 terminates in a cylindrical plug portion 64. The body 53 is mounted with the axis thereof parallel to the axis of the workpiece 34, as shown in FIG. 1.

A cup-shaped pin retaining member 66 is rotatably mounted on the body 53, as shown in FIG. 3. Details of construction of the pin retaining member 66 are shown in FIGS. 7, 8 and 9. The member 66 includes a main portion 67 having an axial bore 68 and a counterbore 69. As shown in FIG. 3, the plug portion 64 of the body 53 is received in the bore 68 and the cylindrical portion 62 of the body is received in the counterbore 69. An end face 71

(FIG. 7) of the member 66 engages flatwise against the shoulder face 60 (FIG. 6) of the body 53, as shown in FIG. 3. Four radial openings 72 (FIGS. 7–9 inclusive) are provided in the member 66 arranged at 90 degree intervals around the axis thereof and in the counterbore portion thereof. Each of the radial openings 72 can be provided with a tubular guide insert 73 (FIG. 7) of hardened metal. As shown in FIG. 5, an outer end edge 74 of each guide insert 73 is turned inwardly as indicated at 74. A groove 76 is formed in the outer face of the member 66 extending tangentially of each of the radial openings and extending into each of the guide inserts. A spring pressed detent 77 is mounted in the member 66 in position to extend from the end face 71 into position for engagement in the sockets 61 (FIG. 6) of the body 53 to releasably hold the member 66 in each position at which the radial bore 63 of the body is at an intermediate position and preferably approximately midway between radial openings 72 of the member 66. Threaded sockets 78 (FIG. 8) are provided in the member 66 to receive screw fasteners 79 (FIG. 4), which attach a tool carrying head 81 (FIGS. 3 and 4) to the member 66. A shoulder 82 (FIG. 7) divides the outer face of the member 66 into a face section 83 of generally cylindrical shape and larger diameter and a face section 84 of cylindrical shape and lesser diameter. The head 81 and the member 66 turn together and combine to form a rotary tool support.

Details of construction of the tool carrying head 81 are shown in FIGS. 4 and 11. The head 81 includes a sleeve portion 86 provided with a bore 88 (FIG. 11), and counter bores 89 and 90. Lengthwise sockets 91 receive the screw fasteners 79 (FIG. 11) to mount the sleeve portion on the member 66, as shown in FIG. 3. The face 84 of the member 66 is received in the counterbore 89. A plug 92 (FIG. 11 is received in the bore 88 and the counterbore 90. The plug 92 includes a cylindrical shank 93 of substantially the same diameter as the bore 88 and a cylindrical head 94 of substantially the same diameter as the counterbore 90. The plug 92 can be pressed into the bore 88 and the counterbore 90 or otherwise held in position therein. Radial slots 96 (FIGS. 4 and 22) in a face 97 of the sleeve portion 86 receive tool bars 98. As shown in FIGS. 20 and 21, each tool bar 98 includes a shank 99 provided with a head 100 at one end thereof, on which a cutter tip 101 is mounted, and a tongue 102 at an opposite end thereof. As shown in FIG. 3, the tongue 102 is received under an edge 103 of the head 94 of the plug 92. A counterbored socket 104 (FIGS. 20 and 21) in the shank receives a screw 106 (FIG. 4) which attaches the shank to the tool carrying head 81. The screw 106 is received in a threaded socket 106' (FIG. 22) in the sleeve portion 86. A set screw 107 (FIG. 4) mounted in a socket 108 (FIG. 22) in the plug 92 engages the tongue 102 to lock the shank in position. The other tool bars are of similar construction and are similarly mounted.

The pin retaining member 66 and the tool carrying head 81 are held in selected indexed positions by a cylindrical pin 108' (FIG. 12) which is received in the radial bore 63 (FIGS. 3 and 6) of the body 53 and is urged radially outwardly of the bore 63 by a compression spring 109 (FIG. 3) mounted in the radial bore 63. When the member 66 and the head 81 are in indexed position, the pin 109 extends into one of the radial openings 72 (FIG. 5) of the member 66 being received inside one of the guide inserts 73 thereof.

When the tool carrying head 81 is in indexed position, it is locked in that position by a clamp sleeve 112 (FIGS. 3 and 10). The sleeve 112 has an axial bore 113 (FIG. 10) and a counterbore 114, which are separated by a shoulder 116. A portion of the counterbore is threaded as indicated at 117. A radial, internally threaded bore 118 extends from the unthreaded portion of the counterbore 114 outwardly through a boss 119 on the sleeve 112. The sleeve 112 is rotatably mounted on the pin retaining member 66, as shown in FIG. 3, with the threaded portion 117 in threaded engagement with the threads on the flange 58 of the body 53. The shoulder 113 (FIG. 10) engages the shoulder 82 (FIG. 7) of the pin retaining member so that, when the sleeve 112 is turned in clamping direction, the pin retaining member 66 is clamped to the body 53 to hold the tool carrying head and the tool bars in firmly fixed position. The radial bore 118 (FIG. 10) of the clamp sleeve 112 can be aligned with one of the radial openings 72 (FIG. 7) of the pin retaining member 66 and with the pin 108 (FIG. 3) when the clamp sleeve is swung from clamping position sufficiently to release the clamping action.

When the clamping action has been released and the radial bore 118 of the clamp sleeve 112 has been aligned with the pin 108, a plunger 121 can be advanced radially inwardly of the opening 72 in the pin retaining member 66 (downwardly as shown in FIGS. 3 and 5) to drive the pin 108 inwardly until the pin is released from the opening 72 of the pin retaining member 66 and the plunger 121 is received in the opening 72 so that, as the plunger 121 is swung around the axis of the body 53, the pin retaining member 66 and the tool carrying head 81 can be turned in indexing direction.

Details of construction of the plunger 121 are shown in FIGS. 5 and 13. The plunger 121 has an elongated cylindrical body 122 (FIG. 13) on which a ring 123 is mounted. A pin 124, which extends through the body 122, anchors the ring 123 in position thereon. A threaded axial bore 124' is formed in an upper end portion of the body 122. An axial socket 126 (FIG. 5) is formed in an opposite end portion of the body 122. A compression spring 127 mounted in the socket 126 urges a ball member 128 downwardly of the body 122. A lower end edge 129 of the body 122 is turned inwardly sufficiently to retain the ball in the socket 126 with a portion of the ball extending from the lower end of the body.

The plunger 121 is guided by a sleeve guide 131 (FIGS. 3, 14 and 15) having a lengthwise bore 132 (FIG. 14), in which the plunger 121 is guided, as shown in FIG. 3, and a counterbore 133 (FIG. 14) in which the ring 123 is received, as shown in FIG. 3. A compression spring 134 urges the plunger 121 toward the retracted position shown in FIG. 3. The spring 134 bears on the ring 123 and on a shoulder 136 (FIG. 14) which separates the bore 132 and the counterbore 133. A ring plug 137 (FIG. 16) having a central bore 138 (FIG. 17) surrounds the plunger 121 and is positioned to engage the ring 123 of the plunger 121 to hold the plunger 121 and the guide 131 in assembled relation, as shown in FIG. 3. A threaded end 139 (FIG. 16) of the ring plug 137 is received in a threaded portion 140 (FIG. 14) of the counterbore 133. Flats 141 on the sleeve guide 131 and flats 142 (FIG. 17) on the ring plug 137 can be engaged by wrenches (not shown) for turning the ring nut 137 and the sleeve guide 131 into assembled relation. A threaded tip 143 (FIG. 14) of the sleeve guide 131 is received in the threaded radial bore 118 (FIG. 10) of the clamp sleeve 112 to assemble the sleeve guide 131 and the clamp sleeve 112.

A handle 144 (FIGS. 3 and 18) is attached to the plunger 121 and is slideably mounted on the sleeve guide 131. The handle 144 has a lengthwise bore 146 (FIG. 18) and counterbores 147 and 148. A shoulder 149 between the bore 146 and the counterbore 148 engages the upper end of the plunger 121. A screw fastener 151 (FIGS. 3 and 19) has a head 152 which is received in the counterbore 147 and a threaded shank 153 which is received in the threaded axial bore 124 (FIG. 13) of the plunger 121 to hold the handle 144 and the plunger 121 in assembled relation.

The tool bars 98 (FIG. 4) mounted in the head 81 can carry a series of tools to be used sequentially or can include two identical tools for conducting a first operation and two identical tools for conducting a second operation. The tools can be sharpened to present corresponding cutting edges when in indexed position. When a first machining operation is completed or if a first tool fails or otherwise become inoperative due to breakage or otherwise, the tool holder is backed away from the workpiece 34 (FIG. 1), as by turning a cross feed handle 156, in the usual manner. In FIG. 1, the handle 144 is shown in clamped position. The handle 144 can be held with one hand and can be swung upwardly, as indicated in FIG. 1 (clockwise in FIG. 2) to release the clamping action and until the handle is in the position shown in FIGS. 2 and 3 where the plunger 121 (FIG. 3) is aligned with the pin 108'. As shown in FIG. 5, the ball 128 at the inner end of the plunger 121 enters along the slot 76 and can engage the inwardly turned edge 74 of the guide insert 73 when in this position so that the operator can feel the proper position. Then the handle 144 can be advanced radially inwardly to cause release of the pin 108 from the opening 72 of the member 66 to be replaced by the lower end of the plunger 121. Then, as the handle 144 is swung further in the same direction, the member 66 is swung together with the head 81 and the tool bars 98 until the head 81 has been advanced approximately 45 degrees and until the spring pressed detent 77 (FIG. 7) engages one of the sockets 61 (FIG. 6) of the body 53. Then the handle 144 can be swung back 90 degrees (counter-clockwise in FIG. 2) while the detent holds the head 81 in position and until the plunger 121 is aligned with another opening (indicated at 72a in FIG. 7) in the member 66. As the handle 144 is moved backwardly, the ball 128 rides along the groove 76 (FIG. 5) being pressed upwardly against the spring 127 until it rides on the face section 83 of the member 66. Then the handle 144 can be advanced inwardly radially again to bring the plunger 121 into the other opening 72a and the handle 144 can be swung approximately 45 degrees in the first direction (clockwise in FIG. 2) and until the other opening 72a is aligned with the pin 108, whereupon the pressure of the spring 109 urges the pin 108 into the other opening 72a. Then the handle 144 can be swung back to its initial position to clamp the member 66 to the body 53, and the tool holder 54 can be restored to its original position by turning the cross feed handle 156 (FIG. 1) back to its original position whereupon a new tool is in proper position for machining the workpiece 34. All the operations can be carried out using only a single hand to operate the handle 144 leaving the other hand free to turn the crank 156.

The tool holder illustrated in the drawings and described above is subject to structural modification without departing from the spirit and scope of the appended claims.

Having described my invention, what I claim as new and desire to secure by Letters Patent is:

1. A tool holder for a machine tool which comprises a body, means for mounting the body on the machine tool adjacent a workpiece, a tool support rotatably mounted on the body, there being a transverse socket in the body, a pin mounted in the socket, means urging the pin outwardly of the socket, a plurality of tools carried by the tool support, there being a plurality of openings in the tool support alignable with the pin, each of the openings being so related with one of the tools that when the pin is received therein, the tool associated therewith is in a predetermined indexed position, a clamp ring rotatably mounted on the tool support and on the body and engageable therewith when in a clamped position to lock the tool support in position on the body, and a plunger mounted on the clamp ring for moving inwardly thereof and alignable with the pin in one of said openings, inward movement of the plunger along said one of the openings advancing the pin out of engagement with the tool support, the plunger being engageable in said one of the openings, swinging of the plunger when the pin is in released position swinging the tool support in tool indexing direction.

2. A tool holder as in claim 1 wherein there is detent means interacting between the tool support and the body for holding the tool support in partly indexed position, the plunger being swingable in reverse direction when the tool support has been advanced to partly indexed position into position for engagement in another of the openings of the tool support, further swinging of the plunger in the original direction when in engagement in the other opening swinging the tool holder into position for engagement of the pin in the other opening.

3. A tool holder as in claim 1 wherein the plunger moves radially of the clamp ring.

4. A tool holder as in claim 1 wherein the clamp ring is in threaded engagement with the body and wherein facing shoulders on the clamp ring and on the tool support are in engagement when the clamp ring is in clamped position.

5. A tool holder as in claim 1 wherein the plunger moves radially of the clamp ring, there is a spring pressed tip at an inner end of the plunger, the tool support has a generally cylindrical face in which the openings thereof are formed, the spring pressed tip rides on said face when the plunger is in a retracted position, and the tip enters one of the openings when the plunger is aligned therewith and is engageable with a side edge of the opening.

6. A tool holder as in claim 5 wherein there is a generally tangentially extending groove in the cylindrical face at each opening of the tool support, and the spring pressed tip follows one of said grooves when the clamp ring is swung away from indexing direction to advance the tip onto said face to swing the tip of the plunger out of the opening associated with said one of the grooves.

References Cited
UNITED STATES PATENTS 2,862,408  12/1958  Stirrett _____ 82—36 XR

FOREIGN PATENTS 127,289  4/1948  Australia.

LEONIDAS VLACHOS, Primary Examiner